UNITED STATES PATENT OFFICE.

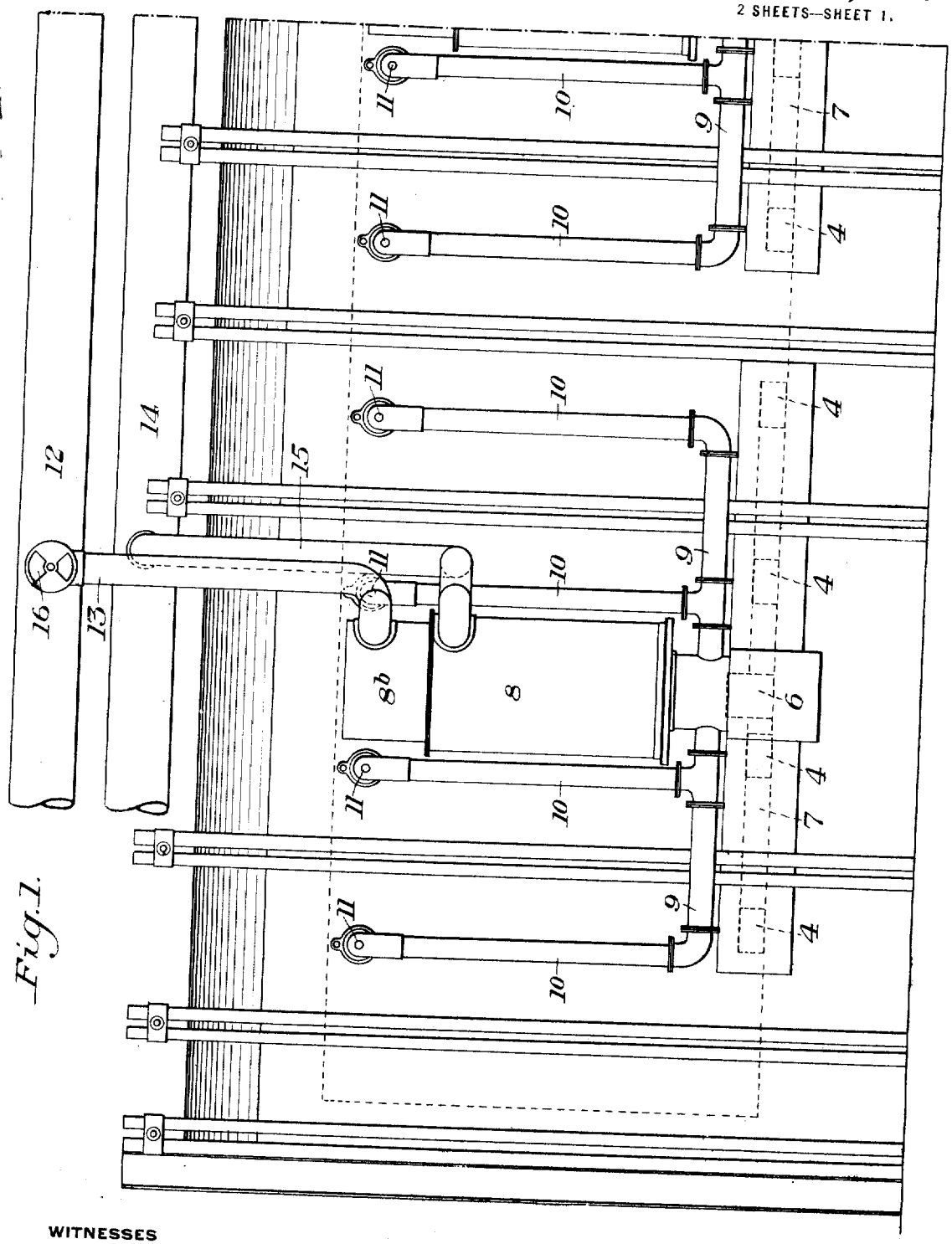

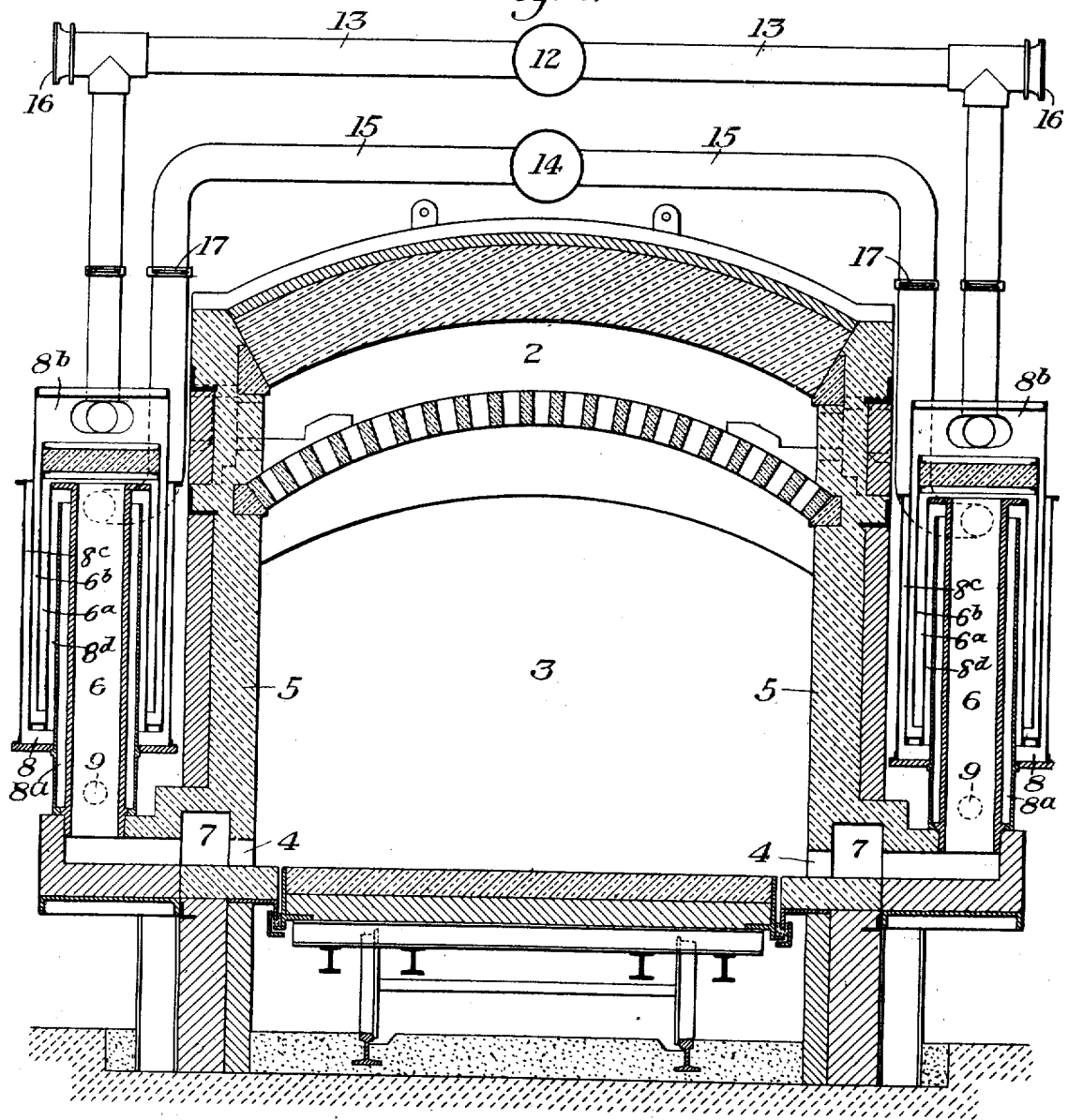

WILLIAM C. BUELL, JR., OF OSBORNE BOROUGH, PENNSYLVANIA, ASSIGNOR TO TATE-JONES & CO., INC., OF PITTSBURGH, PENNSYLVANIA, A CORPORATION OF PENNSYLVANIA.

HEATING-FURNACE.

1,344,437. Specification of Letters Patent. Patented June 22, 1920.

Application filed April 8, 1918. Serial No. 227,292.

*To all whom it may concern:*

Be it known that I, WILLIAM C. BUELL, Jr., a citizen of the United States, residing at Osborne borough, county of Allegheny, and State of Pennsylvania, have invented a new and useful Improvement in Heating-Furnaces, of which the following is a full, clear, and exact description, reference being had to the accompanying drawings, forming part of this specification, in which:

Figure 1 is a side elevation of a portion of a heating furnace embodying my invention.

Fig. 2 is a transverse vertical section of the same, and

Fig. 3 is a detail sectional view of a portion of one of the side walls of the furnace.

My invention has relation to heating furnaces and is designed to increase the efficiency of the furnace in a number of ways.

In my co-pending application Serial No. 223,793, filed on March 21, 1918, I have described and claimed a heating furnace of the over-fired type, in which the flues from the base of the heating chamber extend outwardly through opposite side walls of the chamber and are connected at their outer ends to vertical stacks standing upwardly at the sides of the furnace. By this arrangement I am enabled, as more fully pointed out in such application, to decrease the thickness of the furnace walls, to simplify the construction of such walls, and to effect a saving in heat losses from the furnace. In said application I have also described and claimed a form of my invention in which the external flues at the sides of the furnace are provided with single-pass recuperators whereby a portion of the heat of the out-going gases is utilized to heat the air supplied to the furnace.

With the recuperator construction and arrangement shown in said application, it is possible that in some special instances the maximum amount of sensible heat from the fluid gases may not be transferred to the air, due to the inability to provide a recuperator of sufficient height. Such condition might be due to relatively low head room in the building containing the furnace, or to other mechanical limitations.

My present invention provides an arrangement in which a much greater heat transfer area can be obtained at a relatively small height. With such an arrangement there is, of course, considerable friction interposed in the recuperator passages; and it is, therefore, necessary to provide means for moving both the air and flue gases. For this purpose, the air entering the recuperator is under pressure, originating in a fan, compressor or the like; and a suitable exhaust system is provided for producing suction in the gas passes of the recuperator. The use of air under pressure, combined with an exhaust system for the waste gases, enables me to obtain a further advantage, since the mechanical draft produces a condition of sub-atmospheric pressure in the heating chamber of the furnace in which the waste gas flue leading to the recuperator originates. By properly correlating the volume of air entering for combustion and the volume of the products of combustion, a condition of atmospheric pressure or balanced draft can be brought about in the furnace. In the ordinary furnace practice, the pressure above atmospheric is produced in the furnace chamber by the air entering for combustion and the combustive reaction; and this causes gases and flame to blow out around the doors, lighting holes and other points where openings occur between the heating chamber and the atmosphere. This is a condition which wastes fuel, causes rapid deterioration of the furnace and produces poor working conditions in the vicinity of the furnace, but is entirely overcome by my invention.

Referring to the accompanying drawings, in which I have shown my invention applied to an over-fired furnace, which is, in general, of well known type, the numeral 2 designates the upper combustion chamber in which the burners are arranged, and 3 the lower heating chamber. 4 designates flues leading outwardly through the side walls 5 of the furnace at the base of the heating chamber, and which communicate at their outer ends with the vertical flues 6 which extend upwardly at each side of the furnace. As shown in Fig. 3, I preferably manifold a number of the flues 4, by a common connection 7, to which the external vertical flue 6 is connected. As shown, these flues 4 are manifolded in sets of four, although I do not restrict myself to this particular arrangement. Ordinarily in furnaces of this type, there is one burner for each of the flues 4; and when the arrangement shown in Fig. 3 is followed, there will be one of the vertical flues 6 for each four burners.

Placed around each of the flues 6 is a recuperator 8 of the counter-current type, the air flowing inwardly through concentric channels which alternate with concentric channels through which the waste products flow outwardly. The upper end of the flue 6 opens into a downwardly extending pass of the recuperator, and the incoming air enters the outer pass of the recuperator. The course of the gases and the air in the recuperator is as follows:—The gases flow up through the flue 6, then outwardly and down the annular flue 6ª to the bottom of the recuperator and then up through the annular flue 6ᵇ and out from the top of the recuperator. The air enters the outside annular air flue 8ᶜ of the recuperator, passes to the bottom of the recuperator and then up the annular air flue 8ᵈ to the top of the recuperator, and then down the annular air flue 8ª and out into the manifold 9. The recuperator may in general, be of any suitable construction of the double surface type in which the air and gases flow in concentric layers, each layer inclosing the next layer inside. It is preferable, on account of economy in construction, to make the baffles and partitions of the recuperator cylindrical; but they may be made square or of any other desired shape. The term "concentric" is intended to be one of definition, to designate an arrangement of inclosing passages one surrounding the other, and not of limitation.

The last or inner down-pass 8ª of the gas passes is shown as extending below the other passes of the recuperator; and to the lower extension of this pass 8ª is connected a manifold 9 having the four branches 10 supplying the respective burners 11.

12 designates a suction pipe or main which is connected to any suitable exhauster, such as a fan, not shown, and from opposite sides of which connections 13 lead in multiple to the first passes of the recuperators or to the flues 6, the latter, of course, forming a portion of the recuperators. 14 is an air pressure pipe or main supplied from any suitable source and from opposite sides of which lead in multiple the pipe connections 15, extending to the outer air passes of the respective recuperators, the latter being preferably extended upwardly above the top of the other passes, as indicated at 8ᵇ. Preferably, each of the connections 13 will be provided with a suitable valve or damper 16 for regulating the draft suction therein. Each of the connections 15 will also preferably be provided with a suitable regulating valve 17 for regulating the entering air. The suction and draft systems may be correlated or synchronized in any well known manner (as by mounting the rotor elements of a blower and exhauster upon the same shaft) so as to give a balanced draft and thereby maintain a substantially atmospheric pressure within the furnace. By means of the damper 16 and valve 17 the connections of the several recuperators may be independently controlled so as to reduce equal or unequal conditions therein, as may be desired.

It will be observed that my invention provides a heating furnace in which there are a plurality of waste gas flues arranged in multiple at each side of the furnace and exteriorly of the side walls thereof; that each of these external flues is provided with a multiple pass recuperator, this providing means whereby the pressure air necessary for combustion is heated to a high degree before being delivered to the burners by extracting the maximum amount of the sensible heat by the outcoming gases. Also I provide a flue and recuperator system of this character with pressure and exhaust connections which may be correlated and controlled to provide for a balanced draft in the furnace.

The construction and arrangement which I have shown and described is a simple and preferable one; but I do not desire to limit myself thereto as it is obvious that various changes can be made in the construction and arrangement of the flues, recuperators, draft system, etc., without departing from the spirit and scope of my invention as defined in the appended claims. My invention is also applicable to other furnaces using fluid fuel and having a plurality of burners and outlet flues.

I claim:

1. A heating furnace having an outlet flue leading outwardly through its side wall and thence upwardly at the exterior of said wall, and a multiple pass recuperator surrounding the exterior flue through which it discharges; substantially as described.

2. A heating furnace having an outlet flue leading outwardly through its side wall and thence upwardly at the exterior of said wall, and a multiple pass recuperator surrounding the exterior flue through which it discharges, together with gas exhausting and air supplying means connected respectively to the gas and air passages of the recuperator; substantially as described.

3. A heating furnace having an outlet flue leading outwardly through its side wall and thence upwardly at the exterior of said wall, and a multiple pass recuperator surrounding the exterior flue through which it discharges, together with gas exhausting and air supplying means connected respectively to the gas and air passages of the recuperator, and means connected with said gas and air supplying means to produce a balanced draft in the furnace; substantially as described.

4. A heating furnace having its heating chamber provided at the base thereof with a plurality of uses extending outwardly through the side walls of the furnace, and thence upwardly at the exterior of said walls, and a multiple pass recuperator in connection with each of the external flues, said recuperators having their air and gas passages connected in multiple with air supplying and gas exhausting means; substantially as described.

5. A heating furnace having its heating chamber provided at the base thereof with a plurality of flues extending outwardly through the side walls of the furnace, and thence upwardly at the exterior of said walls, and a multiple pass recuperator in connection with each of the external flues, said recuperators having their air and gas passages connected in multiple with air supplying and gas exhausting means, together with means whereby the connections between the different recuperators and air supplying and gas exhausting systems may be individually controlled; substantially as described.

6. A heating furnace of the over-fired type having a plurality of waste gas flues leading outwardly through the lower portion of each of its side walls, passages connecting said flues in groups, a waste gas flue leading upwardly from each of said passages, and a multiple-pass recuperator in connection with each of the last named flues; substantially as described.

7. A heating furnace having its heating chamber provided at the base thereof with a plurality of flues extending outwardly through the side walls of the furnace, and thence upwardly at the exterior of said walls, a recuperator in connection with each of said external flues, and means whereby the connections between the different recuperators and the air supplying and gas exhausting systems may be individually controlled; substantially as described.

8. A heating furnace having an upper combustion chamber and a lower heating chamber, said heating chamber having an outlet flue leading outwardly through its side wall and thence upwardly adjacent the exterior of said wall, and a multiple pass recuperator surrounding the exterior flue through which it discharges; substantially as described.

9. A heating furnace having an upper combustion chamber and a lower heating chamber, said heating chamber having a plurality of outlet flues leading outwardly though each of its side walls and thence upwardly adjacent to and exterior of said walls and multiple pass recuperators for the upwardly extending portions of said flues; substantially as described.

10. A heating furnace having a heating chamber and means for introducing a heating medium at the upper portion of said chamber, said furnace having a waste gas flue leading outwardly from said heating chamber through the side walls of the furnace, and a vertically extending flue exterior of said side walls and communicating at its lower end with the outer end of said waste gas flue, substantially as described.

11. A heating furnace having a heating chamber and means for introducing products of combustion into the upper portion of said chamber, said chamber having a plurality of waste gas flues leading outwardly through the lower portion of the side wall of said heating chamber, and vertically extending flues adjacent to and exterior of said side walls and communicating at their lower ends with the outer ends of said waste gas flues, substantially as described.

In testimony whereof I have hereunto set my hand.

WILLIAM C. BUELL, Jr.

Certificate of Correction.

It is hereby certified that in Letters Patent No. 1,344,437, granted June 22, 1920, upon the application of William C. Buell, jr., of Osborne Borough, Pennsylvania, for an improvement in "Heating Furnaces," errors appear in the printed specification requiring correction as follows: Page 3, line 6, claim 4, for the word "uses" read *flues;* same page, strike out lines 68 to 89, comprising claims 10 and 11; and that the said Letters Patent should be read with these corrections therein that the same may conform to the record of the case in the Patent Office.

Signed and sealed this 2d day of June, A. D. 1925.

[SEAL.]
KARL FENNING,
*Acting Commissioner of Patents.*